May 11, 1965 R. J. GUARNIERI ETAL 3,183,290
METHOD OF FILLING GROOVES ON SUBSTRATES WITH CURABLE RESINS
Filed Aug. 17, 1962
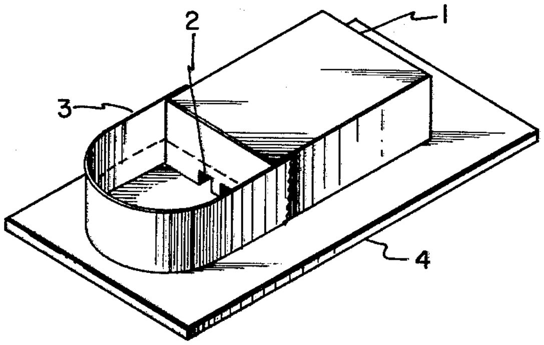
FIG. 1
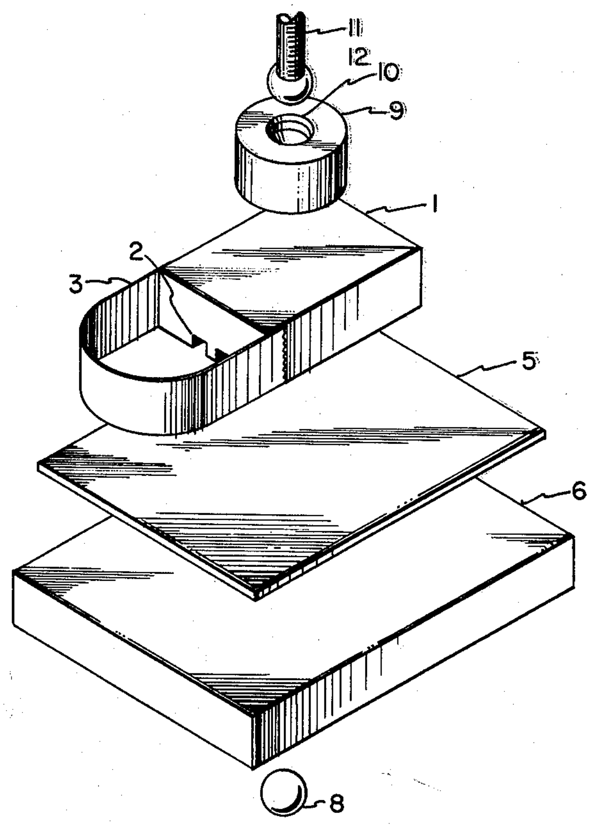
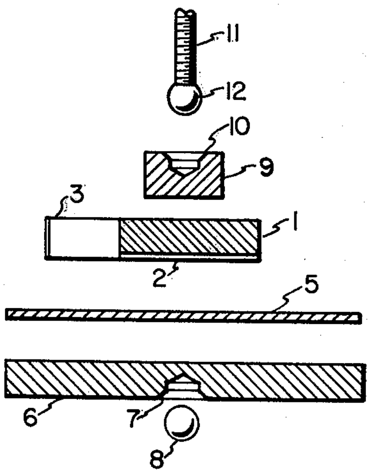
FIG. 3
FIG. 2
INVENTOR.
ROBERT J. GUARNIERI
SEYMOUR WEINER
BY
Robert Ames Norton
ATTORNEY United States Patent Office 3,183,290
Patented May 11, 1965

3,183,290

METHOD OF FILLING GROOVES ON SUBSTRATES WITH CURABLE RESINS

Robert J. Guarnieri, Norwalk, and Seymour Weiner, Stamford, Conn., assignors to Barnes Engineering Company, Stamford, Conn., a corporation of Delaware Filed Aug. 17, 1962, Ser. No. 217,593
6 Claims. (Cl. 264—259)

This invention relates to an improved process for precision filling of grooves in a solid substrate, preferably inorganic, with resin having the capability of curing, preferably a thermosetting resin.

There are a number of occasions where a precision filling of grooves in a solid substrate with a resin is of importance. One of the uses for such substrates with precision filled grooves is as a base for solid backed thermocouples and thermopiles. This new type of thermocouple is described and claimed in the copending application of Hall and Astheimer, Serial No. 189,554 filed April 23, 1962. This is an important field of use for the present invention and the remainder of the specification will be described in conjunction with this use, it being understood that the invention ceases after the grooves on the substrate have been filled and is, therefore, not limited to use in thermocouples.

Solid backed thermocouples normally utilize a substrate in the form of a heat sink, for example a small block of aluminum. Other materials are useful for the substrate such as other metals and materials of good heat conductivity such as fused aluminum oxide, beryllium oxide and the like. Aluminum is usually preferred as the substrate material because of its excellent heat transfer properties, ready machinability and other desirable characteristics. The substrate is provided with grooves which can be machined accurately. The filling of these grooves with a suitable thermal insulator such as a resin, however, presents serious problems and it is with a solution of these problems that the process of the present invention deals.

The grooves in the substrate must be very accurately filled, that is, there must be no air bubbles or other discontinuities. The surface should be smooth and flush with the aluminum of the substrate and it is esential that there be no resin outside of the grooves. These requirements are difficult to fulfill. It is, of course, theoretically possible to cut precise strips of plastic and cement them in the grooves. However, it is almost impossible to make this uniform and the cost in labor and in rejects is prohibitively high.

It is not practical to pour resin over the substrate, filling the grooves, and then subject it to setting as for example by heating to produce an insoluble compound in the case of a thermosetting resin. This procedure will either not fill the grooves full, trap air or will produce a surface which is not flush with the substrate and which is not accurately confined to the grooves.

The present invention utilizes capillary attraction. The grooved side of the substrate is brought into firm contact with a surface which seals the grooves so that no resin can flow outside of them. The nature of this seal will be described in greater detail below. At one end of the substrate there is a dam. This is a vital, and probably the most important single feature of the present invention. The dam has to satisfy a number of requirements. First, it must completely surround one end to produce a reservoir from which liquid resin cannot flow around the outside of the substrate and block the bar end of the grooves. Secondly, liquid resin must be introduced into the dam to form a reservoir the level of which is above the bottom of the grooves and which contains sufficient resin so that when the grooves are filled by capillary attraction, as will be described below, the level of the resin in the reservoir does not fall below the bottom of the grooves so that air cannot be introduced. A third feature of the dam is that it must be possible, after the resin has set, for example transformed by heat into an insoluble form to be readily and completely removed. This may be achieved in several ways. The dam may be of a material which is fragile so that the resin remaining in the reservoir and the dam can be broken off. A typical material for the dam when this modification is used is narrow masking tape made of paper. It is also possible to make the dam of material to which the resin does not adhere, for example it may be made of polytetrafluoroethylene which is ordinarily known by its trademark "Teflon," which shorter name will be used for convenience throughout the remainder of the specification. This plastic, among other properties, has practically no affinity for ordinary thermosetting resins and they, therefore, do not stick to it. Therefore, if the dam is made by a permanent projection of "Teflon" on the substrate it can be removed after the resin is set. Other materials are known to which the resins may not adhere and there are further materials which may be used in the form of sufficiently thin materials so that they can be peeled off or broken off with the resin, for example thin metal foil could be used but it is less satisfactory than masking tape because it is not as stiff and does not make a reservoir at the end of the susbtrate with the same ease.

The production of a reservoir by means of a dam surrounding one end of the substrate, while the most important single feature of the present invention by itself is not enough. It is also necessary that there be a tight seal on the surface of the substrate so that resin flows into the grooves, forms a smooth surface flush with the surface of the substrate and does not leak out beyond the grooves. All of these characteristics are vital and makes sealing a considerable problem.

There are two general solutions to the sealing problem. One is to use a soft material which is strong and to which the resin does not adhere strongly thus a film of "Teflon" can be used or a sheet of extremely soft pure copper. When sealing is effected as described above it is necessary to press the sealing material tightly against the substrate. This requires high pressure exerted very uniformly at right angles to the surface. It may be effected as will be described by means of clamps with ball and socket joints so that the clamping surfaces are maintained perfectly parallel with the substrate surfaces.

When a sealing material such as "Teflon" or copper is used it is necessary that there be rather poor bonding of the resin to the sealing surface otherwise when the resin has been cured and the sealing material is removed there is danger of removing part of the resin with it resulting in resin strips which are not perfectly flush with the substrate surface and are not perfectly smooth. Either "Teflon" or copper is useful and it is possible to produce satisfactory products when they are used in the process with very uniform parallel clamping. However, the very properties of poor adhesion to the resin which makes the sealing materials useful introduces a further problem. Capillary attraction which draws the liquid resin into the grooves on the substrate depends on surface tension phenomena which in turn are intimately connected with the wetting of the surfaces by the resin. The aluminum substrate presents no problem as the thin film of oxide which immediately forms on the aluminum after machining is adequately wet by the resin in its liquid state. However, the sealing material sometimes is not wet adequately and does not draw in the resin uniformly and completely in all of the grooves. As a result there are a fair number of rejects where the groove is not completely full or is not absolutely flush with the substrate surface and smooth. Nevertheless the use of sealing materials for which the resin has little or no adhesion is a thoroughly practical and useful method and is one of the modifications of the present invention.

The preferred modification of the present invention approaches the sealing problem in a different way. Instead of using a material which is comparatively strong and which is solid, such as the "Teflon" or metal foil, a material is used the surface of which, while smooth, remains plastic. Such a material is the ordinary pressure sensitive tape in which a substrate, such as regenerated cellulose, is coated with a permanently plastic and pressure sensitive adhesive layer. The ordinary household tape sold in large quantities under the trademark "Scotch Tape" is eminently suitable for the present invention but is, of course, only one of a number of pressure sensitive tapes which have been developed and which are useful.

When the pressure sensitive tape is used it is only necessary to press the substrate with surrounding dam firmly onto the pressure sensitive side of the tape. It is not necessary to use the continuous strong clamping pressure which is necessary with the solid sealing material such as "Teflon" or soft copper. After the resin is set it adheres tightly to the pressure sensitive tape but since the latter has a plastic surface it can be removed without damaging the resin. The preferred modification of the present invention using pressure sensitive tape has another very important practical advantage. The pressure sensitive adhesive is compatible or at least strongly wetted by practically all thermosetting resins. Therefore, a maximum of surface tension is achieved and the resin is drawn strongly into the grooves and, therefore, the number of rejects due to incompletely filled grooves is greatly reduced. In fact for practical purposes it is eliminated.

When the substrate with a dam around one end is sealed either by metal foil under high clamping pressure or by pressure sensitive tape a small portion of liquid resin is introduced into the reservoir formed by the dam and the sealing surface. The amount of resin introduced must be sufficient to create a level in the reservoir sufficiently high so that when the grooves have been completely filled by capillary attraction the level is still above the bottom of the grooves and so air is not entrained.

After the reservoir defined by the dam has been filled with resin the substrate and resin are heated. The temperature to which they are to be heated depends, of course, on the resin used. Quite high temperatures are required with certain thermosetting resins such as phenol-aldehyde resins and these while included in the present invention are less desirable for this reason. The higher temperatures can adversely affect the dam material or the sealing material if the preferred pressure sensitive tape is used. It is, therefore, preferred to use resins which react to form insoluble products at lower temperatures. The preferred resins for the present invention are the various epoxy resins in which the resin and a hardening reagent are mixed and react, preferably under moderate heating, to form an insoluble product. It is possible to use certain thermoplastic resins which have high enough melting points so that under the temperatures to which the substrate is to be subjected in use they do not soften. However, it is preferable, and for practical purposes just as cheap, to use resins which set to an insoluble material such as epoxy or other thermosetting resins. The particular epoxy resin is not critical. Excellent results are obtained with the combinations sold by Hysol using their resin No. 2039 and catalyst No. 3469.

It is possible to heat the substrate with dam and sealing surface to the temperature at which the resin is cured and maintain it at this temperature until the resin has hardened. Sometimes it is preferable, particularly with epoxy resins, to first heat to a somewhat lower temperature. This reduces the viscosity of the resin and it remains at this lower viscosity for sufficient time to be drawn into the capillaries defined by the grooves. Then the temperature may be raised to that at which the resin sets in a short time. It is an advantage of the present invention that the temperatures used are not in any way critical. They are, of course, determined by the normal hardening temperatures of the particular resin employed, but no critical control is needed. Typical temperatures for epoxy resins are 60° C. for the first heating step and 160° C. for the resin curing step.

After the resin has set the substrate is removed from the sealing surface and the dam is removed and the resin in the reservoir snapped off. In the case of masking tape or other frangible dam materials it is not necessary to remove the dam as it can be snapped off with the resin in one operation. The substrate is left with a resin filling the grooves evenly and without any resin on the sides. It is now ready for use in making thermocouples or for any other use to which it is to be put.

The invention will be described in greater detail in conjunction with a specific example and with the drawings in which:

FIG. 1 is an isometric view of a substrate and dam on a sealing surface;

FIG. 2 is an exploded view showing a solid surface and clamping surfaces,

FIG. 3 is a cross-section through FIG. 2.

FIG. 1 illustrates the preferred modification of the present invention. The substrate is shown as an aluminum block 1 with two grooves 2 machined on its bottom surface. A dam of masking tape is fastened around one end of the substrate and is shown at 3. The substrate and dam are pressed firmly onto a piece of pressure sensitive adhesive tape 4 with the pressure sensitive side up.

The reservoir formed by the dam 3 and the tape 4 is then filled with liquid epoxy resin, or rather the two components which react to form the final resin, to a level sufficiently above the bottom of the grooves 2 so that when they are filled the level still remains above them. This level is shown by a dotted line but for clarity the resin filling the reservoir is not shown on the drawing.

After adding the epoxy resin the assembly is placed in a low temperature furnace and is heated up to 60° C. and held there until the resin has flowed into the grooves 2 by a capillary attraction to completely fill them. The assembly is then either transferred to a higher temperature furnace or the temperature of the furnace is increased to 160° C. and maintained at this temperature until the epoxy resin has set, that is to say has become transferred into an insoluble material. The assembly is then withdrawn from the furnace, the tape 4 peeled off and the hardened resin in the reservoir formed by the dam 3 grasped in the fingers and snapped off in one piece tearing off the paper dam with it. There remains the substrate with the grooves evenly and fully filled flush with the surface of the substrate and having smooth surfaces with no resin broken off.

FIGS. 2 and 3 illustrate an alternative practice process though not quite as good as that shown in FIG. 1. Here the substrate and dam bear the same numbers as in FIG. 1. However, instead of the substrate being placed on pressure sensitive tape it is placed on a thin, smooth piece of "Teflon" or soft copper foil 5. A clamping surface 6 below the copper foil is provided with a central depression 7 into which a steel sphere 8 fits. There is a similar but smaller plate 9 on top of the substrate with a depression 10 and a screw 11 having a hemispherical end 12 fitting into the depression 10. The screw may be part of an ordinary C clamp or it may be part of any other conventional clamping device. When screwed down the substrate is clamped tightly onto the soft material 5 which completely seals the two grooves. Epoxy resin is then introduced into the reservoir formed by the dam 3 as described in connection with FIG. 1 and is then heated. The heating steps are the same as described above. After the resin has set the clamp is unscrewed, the substrate removed from the sealing foil 5 and the dam and its solidified resin broken off, all as described in connection with FIG. 1. The good substrates are equal in quality to those produced by the modification shown in FIG. 1 but there is a somewhat higher percentage of rejects because of the poorer surface tension resulting from the fact that the copper or "Teflon" foil 5 is not thoroughly wet by the resin and so does not develop as much surface tension.

We claim:

1. A process of filling grooves in substantially flat solid substrates with cured resins comprising in combination, (*a*) forming a dam around one end of the substrate the lower edge of which is substantially flush with the grooved surface of the substrate, said dam extending above the bottom of the grooves, and enclosing one end of each groove, (*b*) applying the substrate and dam to a smooth sealing surface with sufficient pressure to substantially flat seal the grooved substrate surface whereby the other end of the grooves remain open, (*c*) maintaining sealing relationship between the surface and the grooved surface of the substrate, (*d*) filling the reservoir defined by the dam, the end of the substrate and the sealing surface with liquid resin to a level sufficiently above the bottom of the grooves in the substrate so that on removal of a volume of resin corresponding to the volume of the grooves the level still remains above the bottom of the grooves, (*e*) permitting the liquid resin to flow into and fill the grooves by capillary attraction, (*f*) curing the resin and removing the sealing surface, dam and resin content of the reservoir from the substrate.

2. A process according to claim 1 in which the sealing surface is a pressure sensitive adhesive tape with the pressure sensitive side in contact with the substrate, said pressure sensitive side being wetted by the resin whereby increased capillary attraction results and peeling off the pressure sensitive tape from the substrate after the resin has been cured.

3. A process according to claim 1 in which the resin is a curable epoxy resin.

4. A process according to claim 2 in which the resin is a curable epoxy resin.

5. A process according to claim 4 in which the dam is formed of adhesive paper tape.

6. A process according to claim 1 in which the dam is formed of adhesive paper tape.

References Cited by the Examiner

UNITED STATES PATENTS

| | | | |
|---|---|---|---|
| 2,323,286 | 6/43 | Ward | 18—34 |
| 2,810,935 | 10/57 | Gaydebouroff | 264—316 |
| 2,956,848 | 10/60 | St. Clair | 264—259 XR |

ROBERT F. WHITE, *Primary Examiner.*

ALEXANDER H. BRODMERKEL, *Examiner.*